UNITED STATES PATENT OFFICE 2,440,729

WATER-SOLUBLE HEAVY METAL SALTS OF THIOSORBITOL AND OTHER MONOTHIO SUGAR ALCOHOLS

Frank Kerr Signaigo, Wilmington, Del., assignor to E. I. du Pont de Nemours & Co., Wilmington, Del., a corporation of Delaware No Drawing. Application March 25, 1944, Serial No. 528,179

6 Claims. (Cl. 260—447)

This invention relates to salts of mercapto alcohols and more particularly to salts of polyhydroxy mercaptans. This application is a continuation-in-part of copending application S. N. 426,704 filed January 14, 1942, now Patent No. 2,410,844, dated Nov. 12, 1946, the disclosure of which is hereby incorporated herein.

This invention has as an object the production of new and useful compositions of matter. Another object is to provide salts of mercapto alcohols. A still further object is the preparation of metal salts of aliphatic monothio sugar alcohols containing at least five carbon atoms and having the configuration of an aldose or ketose sugar except that the carbonyl, =CO, group has been replaced by the group

Other objects will appear hereinafter.

These objects are accomplished by the invention of water-soluble heavy metal salts, of monothio sugar alcohols of at least five carbon atoms, i. e., of aldose and ketose monosaccharides of at least five carbon atoms wherein the oxo carbonyl, =C=O, group is replaced by the

group.

The monothio sugar alcohols of at least five carbon atoms may be prepared readily and economically as described in copending application S. N. 357,419 filed September 19, 1940 (now U. S. Patent 2,402,640), the disclosure of which is hereby incorporated herein. This method of preparation consists essentially of hydrogenating a reducing sugar, in the presence of a sulfactive catalyst and hydrogen sulfide which may be formed in situ from sulfur.

In the practice of this invention, the metal salt of the monothio sugar alcohol may be prepared by dissolving the metal oxide or hydroxide, preferably in freshly precipitated or finely dispersed form, in an aqueous solution containing an equivalent amount of the monothio sugar alcohol. When necessary, heat is employed to assist the reaction. Alternatively, a salt of the metal may be dissolved in an aqueous solution of the monothio sugar alcohol or the same may be added to an aqueous solution or suspension of the metal salt. The metal salts of the monothio sugar alcohols may be isolated by evaporating their aqueous solutions to dryness or by precipitation by means of a non-solvent.

The heavy metal salts of the monothio sugar alcohols may be employed in the purification of the same. The monothio sugar alcohols are not readily purified but their heavy metal salts may readily be purified. When the purified heavy metal salt is suspended or dissolved in a volatile inert liquid solvent for the thio sugar alcohol which is a non-solvent for the heavy metal sulfide, the addition of hydrogen sulfide causes a precipitation of the heavy metal sulfide which is readily separated by filtration. The monothio sugar alcohol may then be isolated in a state of higher purity from the filtrate. Suitable volatile inert liquids include water; water-soluble lower aliphatic monohydric alcohols such as methanol, ethanol, butanol, and mixtures thereof with water; and water-soluble ethers, e. g., dioxane, and mixtures thereof with water. This procedure is exemplified in Example III below.

The invention is further illustrated by the following examples wherein parts are by weight.

Example I

Fifty parts of 1-thiosorbitol is dissolved in 100 parts of absolute ethanol with heating and the solution then cooled out of contact with air to 10 to 15° C. A cooled solution of sodium ethylate obtained by dissolving six parts of sodium in absolute ethanol is added drop-wise to the well agitated 1-thiosorbitol solution. The sodium salt of 1-thiosorbitol separates as a bulky, white solid. This is collected on a funnel by suction out of contact with moist air and washed with absolute alcohol and then ether. It is dried in vacuo.

Example II

Forty parts of 1-thiosorbitol is dissolved in 50 parts of water and eight parts of calcium hydroxide added. The solution is warmed to 60 to 70° C. and shaken to effect solution of the calcium hydroxide. After 30 minutes, the solution is allowed to cool and stand overnight. The undissolved calcium hydroxide is separated by filtration and the clarified solution then concentrated under reduced pressure to remove the water. The viscous product is covered with about an equal volume of absolute alcohol and stirred until the calcium salt is obtained as a hard, granular solid. It is collected on a funnel protected from moist air, washed with absolute ethanol and anhydrous ether and then dried in vacuo.

Example III

One thousand parts of an aqueous solution containing 220 parts of 1-thiosorbitol is treated with 85 parts of powdered cuprous oxide, the temperature being maintained at 40° C. by external cooling. The mixture is then poured with stirring into 3200 parts of 95% ethanol and the precipitated copper thiosorbitol is filtered and washed with additional ethanol. The copper salt is then suspended in 640 parts of 90% ethanol and 10% water, and hydrogen sulfide bubbled through the mixture until absorption is complete. The precipitated copper sulfide is separated by filtration and the alcohol removed from the filtrate by vacuum distillation. The refined, syrupy thiosorbitol is then dissolved in 280 parts of anhydrous ethanol, cooled, and allowed to stand for 24 hours at 5° C. The crystallized 1-thiosorbitol is separated by filtration and dried in vacuum. There is obtained 172 parts of 1-thiosorbitol having a purity of 94 to 96%. This example illustrates a convenient method of purification of 1-thiosorbitol by converting the polyhydroxythiol to a heavy metal salt, isolating the salt and regenerating the pure polyhydroxythiol by treating the salt with hydrogen sulfide.

*Example IV*

Acidic solutions of metal salts of 1-thiosorbitol are prepared by dissolving in an approximately equivalent amount of 1-thiosorbitol in the form of a 25% solution in water, the following metal salts:

Silver chloride→silver salt of 1-thiosorbitol+HCl.
Silver iodide→silver salt of 1-thiosorbitol+HI.
Lead iodide→lead salt of 1-thiosorbitol+HI.
Cuprous chloride→cuprous salt of 1-thiosorbitol+HCl.
Mercuric chloride→mercury salt of 1-thiosorbitol+HCl.
Stannous chloride→stannous salt of 1-thiosorbitol+HCl.

The forming of a salt with the liberation of the corresponding free acid reveals the non-ionic character of the heavy metal salts of the polyhydroxythiols. The reaction may be represented as follows:

CH$_2$OH—(CHOH)$_4$CH$_2$SH+AgCl→
    CH$_2$OH(CHOH)$_4$CH$_2$SAg+[H]$^+$[Cl]$^-$

*Example V*

A solution of ten parts of 1-thiosorbitol in 25 parts of glacial acetic acid is prepared by heating until the 1-thiosorbitol is completely dissolved and the solution is then cooled to room temperature. To this is added with shaking a solution of seven parts of mercuric acetate in 25 parts of acetic acid. The precipitated mercuric salt is collected on a funnel and washed with 25 parts of acetic acid and then with sufficient anhydrous ether to substantially free the precipitate of acetic acid. The salt contains 9% sulfur.

*Example VI*

One hundred parts of bismuth trichloride is dissolved in the minimum quantity of 10% hydrochloric acid. To this solution is added 189 parts of 1-thiosorbitol dissolved in water. The resulting clear solution is acidic. It may be neutralized or made alkaline as desired, by the addition of sodium hydroxide without precipitating the bismuth salt of 1-thiosorbitol.

*Example VII*

To an aqueous solution of 1-thiosorbitol, aqueous ammonium hydroxide is added in equal molecular amount. The resulting solution of the ammonium salt of 1-thiosorbitol is shaken with an equivalent amount of powdered lead chromate. The lead chromate immediately dissolves, forming a solution of the lead salt of 1-thiosorbitol.

Although the invention is illustrated by the preparation of a number of metal salts of 1-thiosorbitol, it is applicable to the preparation of salts of aliphatic monothio sugar alcohols of at least five carbons, i. e. to polyhydroxythiols containing at least five carbon atoms and having the configuration of an aldose or ketose monosaccharide except that the carbonyl group has been replaced by the group

Examples of polyhydroxythiols are the pentahydroxyhexanethiols, such as, 1-thiosorbitol, 2-thiosorbitol, thiomannitol, thiodulcitol; the tetrahydroxyhexanethiols, such as thiorhamnitol; the tetrahydroxypentanethiols, such as thioxylitol; trihydroxybutanethiols, such as thioerythritol. These polyhydroxythiols can be prepared conveniently by the catalytic hydrogenation of the corresponding sugars in the presence of hydrogen sulfide.

This invention is applicable to and includes salts of all of the metals with polyhydroxythiols. More specifically, there are included salts of the light metals, e. g., the alkali metals such as sodium and potassium, the alkaline earth metals such as calcium, magnesium and barium, and the earth metals such as aluminum; the heavy metals such as zinc, copper, silver, gold, mercury, arsenic, antimony, bismuth, chromium, lead, tin, iron, cobalt and nickel. The metal salts of the polyhydroxythiols, especially those having three or more hydroxyl groups are readily soluble in water. Moreover, the salts of the heavy metals are but little ionized in aqueous solution. The polyhydroxythiols can also be reacted with ammonia and amines, e. g., methylamine.

In practicing this invention, it is generally not necessary to employ purified polyhydroxythiols. For example, the crude aqueous solution obtained by the hydrogenation of the reducing sugars in the presence of hydrogen sulfide can be used without further purification. While in the preparation of the metal salts of the polyhydroxythiols, it is only necessary to use stoichiometric equivalent of the reactants, an excess of the polyhydroxythiol is generally not harmful and in some cases may be advantageous. When the metal salts used as reactants are capable of oxidizing the polyhydroxythiol to the disulfide as, for example the cupric salts, one equivalent of the polyhydroxy thiol is so consumed and the complex salt consequently formed is that of a metal in a reduced state.

The products of this invention are useful for a variety of commercial purposes. Salts of plating metals may be used in metal plating processes; as homogeneous catalysts, for example, the copper salt for the catalytic addition reactions of acetylene; as oxygen absorbing agents, for example, the manganese salts; as mold inhibitors, for example, the calcium salts; as therapeutic agents, for example, the bismuth, arsenic, calcium, silver and gold salts; and as stabilizers for vinyl resins, for example, the lead and calcium salts.

Metal plating processes using plating metal salts of this invention are described and claimed in copending application Serial No. 426,704 filed January 14, 1942, by Frank Kerr Signaigo and William Jennings Peppel.

As many widely different embodiments of this invention may be made without departing from the spirit and scope thereof, it is to be understood that this invention is not to be limited to the specific embodiments thereof, except as defined in the appended claims.

What is claimed is:

1. A water-soluble, heavy metal salt of a polyhydroxyalkanemonothiol, said polyhydroxyalkanemonothiol being of at least five carbons and having the configuration of a monosaccharide except that the oxo, CO, group of said monosaccharide is replaced by the group, CH(SH).

2. A water-soluble heavy metal salt of 1-thiosorbitol.

3. A water-soluble bismuth salt of a polyhydroxyalkanemonothiol, said polyhydroxyalkanemonothiol being of at least five carbons and having the configuration of a monosaccharide except that the oxo, CO, group of said monosaccharide is replaced by the group, CH(SH).

4. A water-soluble bismuth salt of 1-thiosorbitol.

5. A water-soluble cuprous salt of 1-thiosorbitol.

6. A water-soluble silver salt of 1-thiosorbitol.

FRANK KERR SIGNAIGO.

REFERENCES CITED

The following references are of record in the file of this patent:

UNITED STATES PATENTS

| Number | Name | Date |
|---|---|---|
| 726,130 | Wohl | Apr. 21, 1903 |
| 1,058,643 | Fahara | Apr. 8, 1913 |
| 2,006,003 | Schoeller | June 25, 1935 |

FOREIGN PATENTS

| Number | Country | Date |
|---|---|---|
| 293,363 | Great Britain | July 2, 1928 |
| 397,293 | Great Britain | Aug. 24, 1933 |

OTHER REFERENCES

Carius, Ann. Der. Chem., vol. 122, page 222 (1862).

Reinsen, Organic Chemistry (1891), pages 74 and 75.

Schneider et al., Berichte der Deutchen Chem. Gesell., vol. 61 (1928), pages 1244 to 1263.

Karrer, Organic Chemistry (1938), pages 107 and 108.

Sjoberg, Ber. Deut. Chem. Ges. 75B (1942), pages 13, 14 and 23.

Carins, "Annalen der Chem.," vol. 124, page 222 et seq.